United States Patent Office 3,657,152
Patented Apr. 18, 1972

3,657,152
CATALYST AND PROCESS FOR THE PREPARATION OF 1,3-CYCLOHEXANEDIAMINES
Moses Cenker, Trenton, and Peter T. Kan, Livonia, Mich., assignors to BASF Wyandotte Corporation, Wyandotte, Mich.
No Drawing. Filed May 26, 1969, Ser. No. 827,952
Int. Cl. B01j *11/82*
U.S. Cl. 252—443
6 Claims

ABSTRACT OF THE DISCLOSURE

A process and a catalyst for the preparation of 1,3-cyclohexanediamines are provided. The process comprises hydrogenating 1,3-phenylenediamines in the presence of an alkali-promoted catalyst consisting of cobaltous oxide, calcium oxide, and sodium carbonate at elevated temperature and under moderate pressure to form 1,3-cyclohexanediamines. The aliphatic diamines are useful as intermediates in the preparation of polyurethane, polyurea, polyurethane-polyurea and polyamide coatings, sealants, and elastomers.

---

This invention relates generally to a process and catalyst for the preparation of 1,3-cyclohexanediamines and more specifically, to a process for hydrogenating 1,3-phenylenediamines in the presence of a base-promoted cobalt catalyst. Processes for hydrogenation of aromatic amines are well known in the prior art and a variety of process conditions and catalysts have been utilized in prior art reactions. U.S. Pat. No. 3,351,650 describes various catalysts and process conditions for the hydrogenation of aromatic amines to form corresponding aliphatic amines. Several problems have been encountered in such prior art methods. For example, unless very high pressures and temperatures are utilized, low yields of the hydrogenated products are obtained. Also, in many instances undesirable side reaction products are produced. Expensive exotic metal catalysts are frequently employed and in many instances only low yields are obtained even with such expensive catalysts. The use of alkali-promoted cobalt catalysts for hydrogenation of aromatic amines containing a single amine group per aromatic nucleus is described in an article in JACS 75, 1156 (1953). According to this article, after hydrogenation of the aromatic amine is completed the catalysts have pyrophoric properties and must be handled with caution; also, said catalysts exhibit limited catalytic activity after use in two additional process runs and cannot be subsequently used for efficient additional additional hydrogenation operation. The article also states that the use of alkali-promoted CoO, cabaltous oxide, provided low yields of about 26% of the diamine product.

It is an object of this invention to provide an economical catalyst for the hydrogenation of 1,3-phenylenediamines which is in non-pyrophoric condition after hydrogenation of the said diamine and which catalyst may be repeatedly used for a plurality of individual hydrogenation runs without loss of catalytic activity and efficiency. It is a further object of the invention to provide an economical catalyst for the hydrogenation of 1,3-phenylenediamines which may be used in the absence of a solvent. It is a further object of the invention to provide an economical process for the preparation of high yields of 1,3-cyclohexanediamines by hydrogenation of corresponding phenylenediamines. Another object of the invention is to provide a process for the preparation of 1,3-cyclohexanediamines which can be carried out at moderate pressures and moderately elevated temperature.

The above and other objects and advantages will become apparent from the following description.

The process of this invention broadly comprises the preparation of high yields of 1,3-cyclohexanediamines by contacting with hydrogen at least one 1,3-phenylenediamine at moderate pressure at a temperature greater than room temperature and in the presence of a catalyst consisting essentially of sodium carbonate, cobaltous oxide and calcium oxide to form the corresponding 1,3-cyclohexanediamine. The hydrogenation pressure may vary over a wide range, for example, from about 1500 p.s.i.g. to about 5000 p.s.i.g. Below about 1500 p.s.i.g., lower yields of the diamine products are obtained. The upper limit of 5000 p.s.i.g. may vary widely and is determined in accordance with equipment design and economic considerations. Moderate pressures of about 1500 p.s.i.g. to 2700 p.s.i.g. have been determined to be practical for providing high yields of the desired diamine product. The temperature during hydrogenation may vary within a broad range of about 150° C. to about 250° C. and preferably, is from about 200° C. to about 240° C. when the pressure is from about 2000 p.s.i.g. to about 2700 p.s.i.g.

The 1,3-phenylenediamine compound or mixture of reactant compounds which are contacted with hydrogen during the process are represented by the following structural formula:

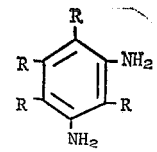

in which R is alkyl or hydrogen.

Representative phenylenediamines include, for example, 1,3-phenylenediamine, 2,4-toluenediamine, 2,6-toluenediamine or mixtures of 2,4-toluenediamine and 2,6-toluenediamine.

The process is carried out by charging a reactor with the catalyst consisting of cobaltous oxide, sodium carbonate and calcium oxide and the phenylenediamine reactant and then pressurizing the reactor with hydrogen to develop a pressure of about 2000 to 2700 p.s.i.g. while heating to maintain a temperature of about 200° C. to about 240° C. and maintaining the process conditions until the phenylenediamine has been converted to the corresponding 1,3-cyclohexanediamine. At the completion of hydrogenation, the reactor is vented, cooled, and the catalyst separated by filtration and the cyclohexanediamine recovered by stripping and distillation steps. The amount of the total catalyst which is employed in the process of this invention is variable and is dictated by the weight ratio of the cobaltous oxide of the catalyst to the 1,3-phenylenediamine reactant and the weight ratio of the amount of each of the calcium oxide and sodium carbonate constituents of the catalyst to the cobaltous oxide. The ratio of the cobaltous oxide to the 1,3-phenylenediamine in parts by weight, should be from about 1.5:20 to about 3.5:20. If said ratio is below 1.5:20 the yield of the cyclohexanediamine product will be objectionably low. If the ratio is greater than 3.5:20 no significant increase in yield of the final product is obtained and consequently the use of the additional catalyst is not economical. The preferred ratio is from about 1.5 to 3.1 parts by weight of cobaltous oxide to about 20 parts by weight of the 1,3-phenylenediamine.

The catalyst consists essentially of cobaltous oxide, calcium oxide and sodium carbonate. The amount of calcium oxide and sodium carbonate may vary considerably but a sufficient quantity of each must be combined with the cobaltous oxide to promote efficient catalytic activity of the cobaltous oxide. If the calcium oxide and sodium carbonate constituents of the catalyst are deleted cobaltous oxide per se has virtually no activity and no hydrogenation of the phenylenediamine results. The ratio in parts by weight of the individual components of the catalyst should be maintained within specific ranges for maximum efficiency of the catalyst. To obtain high yields of 1,3-cyclohexanediamines, the amount of calcium oxide and sodium carbonate employed in the process of the present invention should be from about 1.5 to 2.5 parts by weight of each per part by weight of cobaltous oxide. The preferred ratio of the calcium oxide and sodium carbonate to cobaltous oxide is about 2.0 parts by weight of each per part by weight of cobaltous oxide. The catalyst is prepared by mixing the three constituents in dry form by any conventional means. The cobaltous oxide is not generally available commercially and is prepared by heating either cobaltous hydroxide, $Co(OH)_2$, or cobaltous carbonate, $CoCO_3$, at about 950° C. to 1050° C. for a sufficient time to form the cobaltous oxide, generally from about 6 to 24 hours. In the utilization of said catalyst, a solvent is not required during the hydrogenation process and after completion of the process the catalyst has no pyrophoric properties and no special handling precautions are necessary. The catalyst may also be employed without additional treatment for a large number of individual hydrogenation runs, without loss of efficient catalytic activity. After use in sixteen repeated individual runs, without treatment other than recovery from the reaction mixture after each run, the catalyst maintained the same efficient catalytic activity as during the earlier runs, as evidenced by substantially the same high yields of diamine products obtained. Such results are entirely unexpected and particularly surprising in view of some loss of the catalyst which unavoidably occurs during the recovery of the catalyst after each run.

The following examples are illustrative of the preferred embodiments of the invention but are not intended to be unduly limitative. All quantities included in the examples are in parts by weight unless otherwise specified.

EXAMPLE I

About 333 grams of molten toluenediamine consisting of about 80% 2,4-isomer and 20% 2,6-isomer were charged into a one-gallon stainless steel, stirred autoclave. A uniform dry mixture of 75 grams of cobaltous oxide, 150 grams of calcium oxide and 150 grams of sodium carbonate was added to the toluene-diamine. About 667 grams of molten toluenediamine, the balance of about a 1000 gram (8.2 moles) total of the diamine, were added to the mixture of diamine and catalyst in the autoclave. The autoclave was then sealed, the heater turned on and purged with nitrogen about three times and with hydrogen about twice by building the pressure to about 200 p.s.i.g. and bleeding off. The temperature and pressure were then increased and when the pressure reached 2000 p.s.i.g. the hydrogen booster pump was turned on and when the temperature reached 175–180° C. the stirrer was started. The temperature and pressure were then increased and maintained at about 228–233° C. and 2500–2700 p.s.i.g., respectively. The hydrogen absorption required about 3–5 hours and the rate of absorption ranged from about 200 lbs. per minute initially to about 5 lbs. per minute at termination of the run. The autoclave was then cooled, vented, and the crude product mixture removed. The autoclave was then rinsed with three-300 milliliter portions of methanol and the crude product mixture and methanol rinsings were combined and filtered. The catalyst recovered by filtration was not pyrophoric. The filtrate was then stripped and the remaining liquid distilled. A yield of 78.0% of a mixture of 80% 4 - methyl - 1,3 - cyclohexanediamine and 20% 2-methyl-1,3-cyclohexanediamine was obtained.

The cobaltous oxide utilized in this example was taken from the product quantity prepared in Example VIII below.

EXAMPLE II

The procedure of Example I was followed except that 100 grams instead of 75 grams of cobaltous oxide was used. A total of 17 hydrogenation runs were made using this amount of catalyst. At the end of each cycle, an additional thousand grams of molten toluenediamine were added. At the end of each run, the autoclave was cooled, vented and the catalyst allowed to settle. The organic material was siphoned from the autoclave, filtered and distilled. A total of 17,000 grams of toluenediamine was hydrogenated in this manner to provide a 69.2% yield of a mixture of 80% 4-methyl-1,3-cyclohexanediamine and 20% 2-methyl-1,3-cyclohexanediamine. The catalyst remained non-pyrophoric through the 17 hydrogenation runs and after the sixteenth hydrogenation run had substantially the same efficient catalytic activity as during the earlier runs.

The cobaltous oxide employed in this example was a portion of the product of Example IX below.

EXAMPLES III–VII

Several aliphatic diamines were prepared in accordance with the procedure of Example I with the exception that the pressure range was varied in each case:

| Example | Reaction pressure range, p.s.i.g. | Yield of 1,3-cyclohexanediamine, mole percent |
| --- | --- | --- |
| III | 1,000–1,200 | 39 |
| IV | 1,400–1,600 | 73 |
| V | 1,800–2,000 | 77 |
| VI | 2,000–2,200 | 78 |
| VII | 2,500–2,700 | 76 |

The above data demonstrate that pressure of from about 1500 p.s.i.g. to above 2700 p.s.i.g. provide excellent yields of aliphatic diamines.

The following examples demonstrate the preparation of cobaltous oxide (CoO).

EXAMPLE VIII

A crucible containing 150.0 grams of cobaltous hydroxide, $Co(OH)_2$, placed in a muffled furnace and the temperature of the furnace brought to about 1000° C. in about 1½ hours. This temperature was maintained for about six hours and the crucible cooled to room temperature. The product obtained was ground to powder of a particle size capable of passing through a No. 48 U.S. Standard sieve series screen, and weighed. The product weighed 123.0 grams which was an 18% weight loss based on the starting material. The theoretical weight loss for conversion to CoO is 19.3%. The cobalt content found by analysis was 77.4% and the theoretical cobalt content for CoO is 78.6%.

EXAMPLE IX

The same procedure was followed as in Example VIII except that 200 grams of cobaltous hydroxide was heated at 1000° C. for about 24 hours. The weight loss was 39.4 grams based on the starting material. The theoretical weight loss for conversion to CoO is 19.3%.

EXAMPLE X

The same procedure as in Example VIII was followed except that 291.3 grams of cobaltous carbonate, $CoCO_3$, were heated at 1000° C. for about six hours. The weight loss was 37.3% based on the starting material. The theoretical weight loss for conversion to CoO is 37.0%.

When temperatures below about 200° C. were employed, in the process of this invention, lower yields of the aliphatic diamine were obtained. Temperatures above about 240° C. did not result in significantly higher yields of the aliphatic diamines. A temperature range of about 200° C. to about 240° C. is preferred.

The aliphatic diamines provided by this invention are useful as intermediates in the preparation of polyurethane, polyurea, polyurethane-polyurea and polyamide coatings, sealants, and elastomers.

What is claimed is:

1. A method for producing a non-pyrophoric, reusable, hydrogenation catalyst comprising:
   (a) heating cobaltous hydroxide or cobaltous carbonate at a temperature at about 950° C. to 1050° C. for a sufficient period of time to form cobaltous oxide,
   (b) mixing together the cobaltous oxide of (a), sodium carbonate and calcium oxide, the sodium carbonate and calcium oxide each being present in an amount ranging from about 1.5 to 2.5 parts by weight per part by weight of cobaltous oxide.

2. The method according to claim 1 wherein the sodium carbonate and the calcium oxide are each from about 2.0 parts by weight per part by weight of cobaltous oxide.

3. The method of claim 1 wherein cobaltous carbonate is heated to cobaltous oxide.

4. The method of claim 1 wherein cobaltous hydroxide is heated to cobaltous oxide.

5. In a method for the preparation of cobaltous oxide of the type useful for the manufacture of alkali-promoted hydrogenation catalysts, the improvement which comprises:
   heating either cobaltous hydroxide or cobaltous carbonate to a temperature at about 950° C. to 1050° C. for sufficient time to form cobaltous oxide.

6. A non-pyrophoric, reusable hydrogenation catalyst composition consisting essentially of:
   (a) cobaltous oxide, the cobaltous oxide being prepared by heating cobaltous hydroxide or cobaltous carbonate at a temperature of about 950° C. to 1050° C. for sufficient time to form the cobaltous oxide;
   (b) sodium carbonate, and
   (c) calcium oxide;
the sodium carbonate and calcium oxide each being present in an amount ranging from about 1.5 to 2.5 parts by weight per part by weight of cobaltous oxide.

References Cited

Alicyclic Diamines, Barkdoll et al., February 1951.
Barkdoll et al., Alicyclic Diamines, Mar. 5, 1953.
Kirk-Othmer, Encyclopedia of Chem., pp. 740 and 741, vol. 5 (1963).
Kirk-Othmer, Encyclopedia of Chem., pp. 206–208 (1949).
Hackh's Chem. Dictionary, p. 559 (1969).

DANIEL E. WYMAN, Primary Examiner

P. M. FRENCH, Assistant Examiner

U.S. Cl. X.R.
252—473, 474